United States Patent [19]

Iida

[11] Patent Number: 4,953,630
[45] Date of Patent: Sep. 4, 1990

[54] APPARATUS FOR CONTROLLING AN AUTOMOBILE AIR-CONDITIONER TO CONTROL DEFROST BLEED AIR

[75] Inventor: Katsumi Iida, Konan, Japan
[73] Assignee: Diesel Kiki Co., Ltd., Tokyo, Japan
[21] Appl. No.: 413,391
[22] Filed: Sep. 27, 1989
[30] Foreign Application Priority Data
  Sep. 27, 1988 [JP] Japan .................... 63-241261
[51] Int. Cl.⁵ .................... F25B 29/00; B60H 3/00
[52] U.S. Cl. .................... 165/17; 165/24; 165/25; 165/42; 165/43; 98/2.01; 98/2.08; 98/2.09
[58] Field of Search .................... 165/17, 24, 25, 42, 165/43; 98/2.01, 2.08, 2.09; 237/12.3 A, 12.3 B

[56] References Cited
U.S. PATENT DOCUMENTS 4,685,508 8/1987 Iida .................... 165/17
4,709,751 12/1987 Ichimaru et al. .................... 165/17
4,730,662 3/1988 Kobayashi .................... 165/17
4,791,981 12/1988 Ito .................... 98/2.08
4,829,884 5/1989 Kagohata .................... 98/2.01

FOREIGN PATENT DOCUMENTS 0135311 10/1981 Japan .................... 98/2.08
0092918 5/1985 Japan .................... 98/2.08

Primary Examiner—John Ford
Attorney, Agent, or Firm—Wenderoth, Lind & Ponack

[57] ABSTRACT

An automobile air-conditioner controlling apparatus is equipped with a determination means for determining the amount of air bleeding from a defroster outlet, based on at least the outside temperature and the amount of opening of an air-mix door, when the temperature of blown-off air is higher than a predetermined temperature. By the determination means, the blow-off mode of the apparatus is automatically controlled over an expanded range when the outside temperature is low.

3 Claims, 5 Drawing Sheets

APPARATUS FOR CONTROLLING AN AUTOMOBILE AIR-CONDITIONER TO CONTROL DEFROST BLEED AIR

BACKGROUND OF THE INVENTION

1. Field of the Invention

The present invention relates to an apparatus for controlling an automobile air-conditioner, and more particularly to an apparatus for automatically changing-over and thus controlling the blow-off mode of the air-conditioner.

2. Description of the Prior Art

Air-conditioner controlling apparatuses of the type described above are known in which a target blown-off air temperature is calculated based on a setting temperature, a vehicle compartment temperature and an outside temperature, and in which change-overs are performed between the VENT mode, the BI-L mode, and the HEAT mode in accordance with the target blown-off air temperature. This prior art is exemplified by Japanese Patent Publication No. 19849/1984.

However, with the known control apparatus, if the windowpanes begin to be clouded when the outside temperature is low especially in winter, it is necessary to manually change over the blow-off mode to the DEF/-HEAT mode to increase the amount of air bleeding from a defroster outlet to thereby increase the ability of demisting. Further, in the DEF/HEAT mode, the amount of airflow moving along the windowpanes toward the upper portion of the vehicle compartment, an occupant might feel uncomfortable as the temperature around the head of the occupant increases due to the environmental condition. In order to avoid this increase of the upper-part temperature, a manual operation is then required, e.g., to change over the blow-off mode again to the HEAT mode. Consequently, the occupant has to make troublesome manual operations.

SUMMARY OF THE INVENTION

It is therefore an object of the present invention to provide an automobile air-conditioner controlling apparatus with which the control of the air-conditioner can be automatically performed over an expanded range when the outside temperature is low, thus reducing the manual control range to a minimum.

Another object of the invention is to provide an automobile air-conditioner controlling apparatus with which the demisting of the windowpanes can be performed automatically without impairing a comfortable air-conditioned state giving a relatively cool air over the head of an occupant, which is particularly sensitive to high temperature, and a relatively hot air over the legs of the occupant.

According to the present invention, there is provided an apparatus for controlling an air-conditioner for a motor vehicle, comprising: a duct defining an airflow passageway and having a defroster outlet, a vent outlet, and a heat outlet, each of the outlets opening to a compartment of the motor vehicle to allow air to be blown off from the duct into vehicle compartment; a heater core disposed in the airflow passageway of the duct, at a position biased toward one end of the airflow passageway, for heating air passing the heater core; an air-mix door disposed in the duct upstream of the heater core for regulating an amount of air passing the heater core and an amount of air bypassing; an evaporator disposed in the duct upstream of the heater core for cooling air passing the evaporator; mode doors disposed in the duct for opening and closing the outlets selectively; air-mix door opening calculation means for calculating the amount of opening of the air-mix door based on at least a vehicle compartment temperature and a setting temperature; blown-off air temperature calculation means for calculating the temperature of air blown-off into the vehicle compartment based on the amount of opening of the air-mix door and the cooling temperature of the evaporator; defrosting-air bleeding determination means for determining the amount of air bleeding from the defroster outlet, based on at least an outside temperature and the calculated amount of opening of the air-mix door, when the blown-off air temperature calculated by the blown-off air temperature calculation means is higher than a predetermined temperature; and drive and control means for driving and controlling the mode doors in such a manner that the amount of air bleeding from the defroster outlet is equal to an amount determined by the defrosting-air bleeding determination means.

With this arrangement, since the amount of air bleeding from the defroster outlet is regulated, based on at least the outside temperature and the amount of opening of the air-mix door, during heating when the blown-off air temperature is higher than a predetermined temperature, it is unnecessary to manually change over the blow-off mode to increase the amount of air bleeding from the defroster outlet, even under the environmental condition in which the windowpanes are apt to be clouded. Accordingly it is possible to accomplish a comfortable air-conditioned state in an automatic fashion.

The above and other objects, features and additional advantages of this invention will become manifest to those versed in the art upon making reference to the detailed description and the accompanying drawings in which a preferred embodiment incorporating the principle of this invention is shown by way of illustrative example.

DETAILED DESCRIPTION

Figure 1:
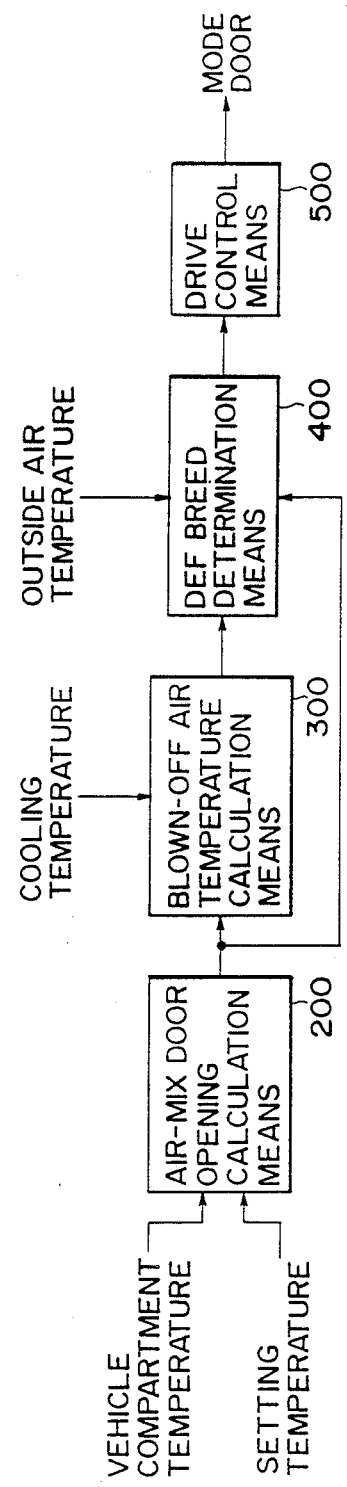
FIG. 1 is a block diagram showing the general function of an automobile air-conditioner controlling apparatus according to the present invention.

The present invention will be described hereinbelow in greater detail with reference to an embodiment shown in the accompanying drawings, in which FIG. 1 illustrates the general construction and function of an automobile air-conditioner controlling apparatus (hereinafter called "control apparatus") embodying the present invention.

The control apparatus generally functions to cool taken-in air by an evaporator and to heat the intake air according to the amount of opening of an air-mix door, and then to supply the cooled or heated air into a compartment of a motor vehicle via a defroster outlet, a vent outlet and a heat outlet, as described below. The opening of each of these three outlets is controlled by means of mode doors, also as described below.

The control apparatus generally comprises: an air-mix door opening calculation means 200 for calculating the amount of opening of the air-mix door based on at least a vehicle compartment temperature and a setting temperature; a blown-off air temperature calculation means 300 for calculating the temperature of air blown-off into the vehicle compartment based on the amount of opening of the air-mix door and the cooling temperature of the evaporator; a defrosting-air bleeding determination means 400 for determining the amount of air bleeding from the defroster outlet, based or at least an outside temperature and the calculated amount of opening of the air-mix door, when the blown-off air temperature calculated by the blown-off air temperature calculation means 300 is higher than a predetermined temperature; and a drive and control means 500 for driving and controlling the mode doors in such a manner that the amount of air bleeding from the defroster outlet is equal to an amount determined by the defrosting-air bleeding determination means 400.

Figure 2:
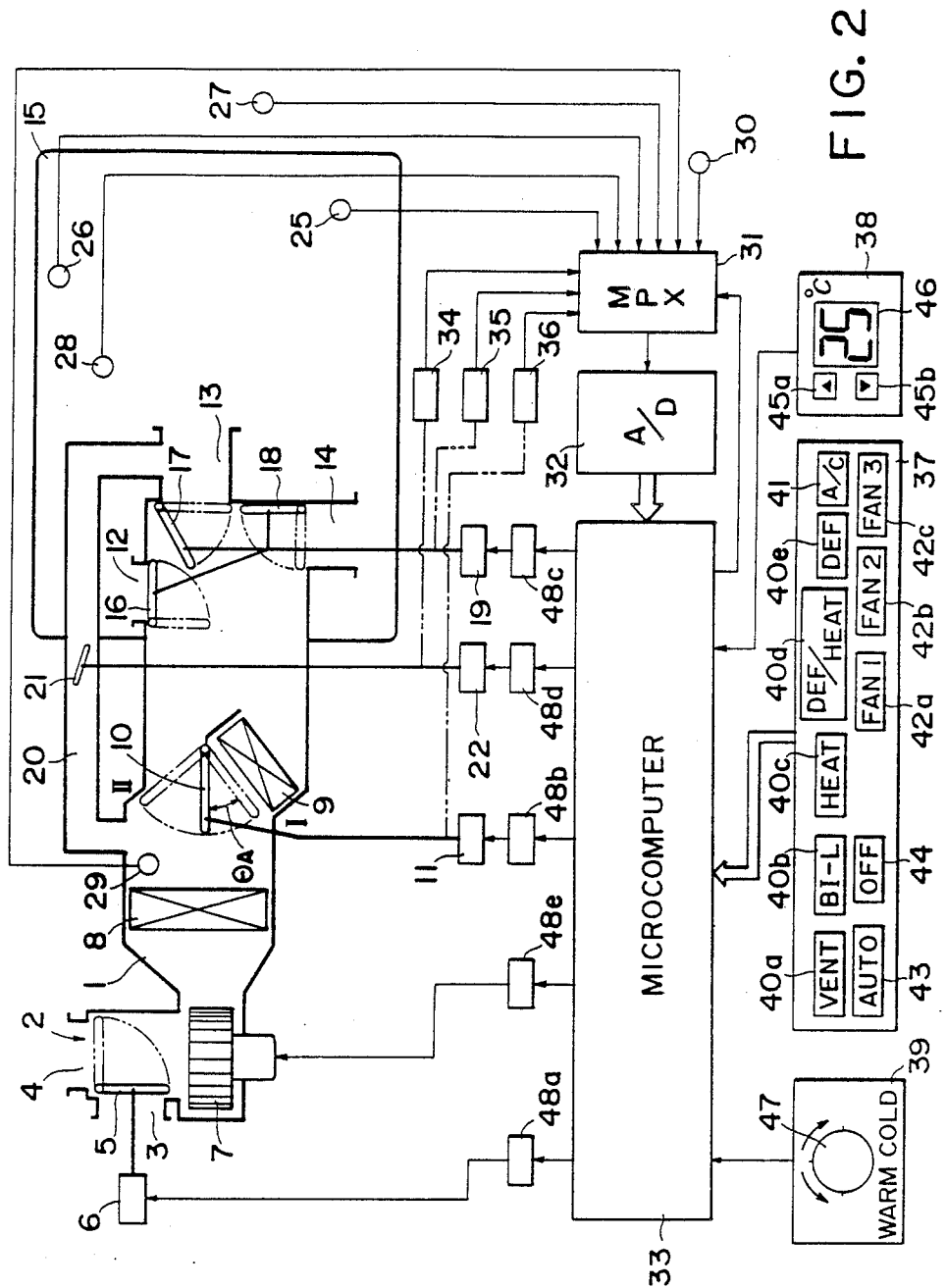
FIG. 2 is a diagramatic view showing the general construction of one embodiment of the apparatus.

As shown in FIG. 2, the control apparatus has an intake door change-over device 2 at the upstream end of a duct 1. The intake door change-over device 2 includes a selecting door 5 disposed at the junction between a recirculated air inlet 3 and an outside air inlet 4 that are provided in a bifurcated fashion. The selecting door 5 is operatively connected to an actuator 6 and driven thereby to select one of the two inlets 3, 4 for allowing the recirculated air or the outside air to be introduced into the duct 1.

A blower 7 is disposed in the duct 1 immediately downstream of the change-over device 2 to force the air to flow downstream through the duct 1. Downstream of the blower 7, an evaporator 8 and a heater core 9 are disposed in this order.

The evaporator 8 is connected in fluid circuit with a non-illustrated compressor and other associated parts so as to jointly constitute a refrigeration system achieving a refrigeration cycle, thereby cooling the air taken into the duct 1. The heater core 9 serves to heat the air passing therethrough by the heat taken up from a cooling water of a motor vehicle engine (not shown) recirculating through the heater core 9. An air-mix door 10 is disposed upstream of the heater core 9 and is operatively connected to an actuator 11. The opening $\Theta_A$ of the air-mix door 10 is regulated by the actuator 11 for adjustably varying the ratio of the amount of air flowing directly through the heater core 9 and the amount of air bypassing the heater core 9, so that the temperature of air to be discharged or blown-off from the duct 1 is controlled to a desired value.

The amount of opening $\Theta_A$ of the air-mix door 10 is 0% when it assumes a full cool position (designated by I in FIG. 2), and is 100% when it assumes a full heat position (designated by II in FIG. 2).

The duct 1 has at its downstream end a defroster outlet 12, a vent outlet 13 and a heat outlet 14 that are provided in a branched fashion and all open to a vehicle compartment 15. Three mode doors 16, 17, 18 are disposed adjacent to the respective outlets 12, 13, 14 to open or block the outlets 12-14. The operation of the mode doors 16, 17, 18 is controlled by an actuator 19 for selecting a desired mode of operation of the air-conditioner.

The duct 1 is provided with a cool air bypass 20 for allowing cool air to bypass a part of the duct 1. The bypass 20 extends from a position of the duct 1, between the evaporator 8 and the air-mix door 10 and terminates short of the vent outlet 13, so that the air passed through the evaporator 8 can be partially supplied directly to the vent outlet 13. The amount of cool air to be supplied via the bypass 20 can be adjusted by regulating the opening of a bypass door 21 by an actuator 22.

A vehicle compartment temperature sensor 25 is supported on an instrument panel or the like for detecting a representative temperature $T_R$ in the vehicle compartment 15. An upper-part temperature sensor 26 is supported on the inside surface of a roof panel or the like for detecting the temperature $T_{Rh}$ of an upper part of the vehicle compartment 15 where the head of an occupant may exist. Designated by 27 is an outside air temperature sensor for detecting the temperature $T_A$ of the air outside the vehicle compartment 15. Reference character 28 designates a sunlit portion temperature sensor for detecting the temperature $T_S$ of a vehicle compartment portion exposed to the incident light of the sun (the radiant heat of the sun); and 29 designates a mode sensor disposed at the evaporator 8 or immediately downstream thereof for detecting the air cooling ability of the evaporator 8 in terms of the temperature of the evaporator 8 or in terms of the temperature of the air passed through the evaporator 8. 30 designates a water temperature sensor for detecting the temperature of cooling water of the engine. Output signals from these respective sensors 25 through 30 are inputted through a multiplexer (MPX) 31 into an A/D converter 32 in the order of selected by the multiplexer 31. After having been digitalized by the A/D converter 32, the output signals are delivered to a microcomputer 33.

Further, reference numeral 34 designates a bypass door opening sensor for detecting the opening of the bypass door 21; 35, a mode door position sensor for detecting the position of the individual mode door 16, 17, 18; 36, an air-mix door opening sensor for detecting the opening of the air-mix door 10. Output signals from these respective sensors 34, 35, 36 are also inputted to the microcomputer 33 via the multiplexer 31 and the A/D converter 32.

The microcomputer 33 is also supplied with the output signals from an instrument panel 37, a temperature setter 38 and an upper-part temperature setter 39.

The instrument panel 37 is provided with an A/C switch 41 for achieving the refrigeration cycle, and five manual switches 40a through 40e for selectively setting a blow-off mode, a VENT mode, a BI-L mode, a DEF/HEAT mode and a DEF mode. The instrument panel 37 is also provided with a series of fan switches 42a through 42c for selectively changing the rotational speed of the blower 7 between a succession of low (FAN1), medium (FAN 2) and high (FAN3) levels, an automatic switch (AUTO) 43 for automatically controlling all of the air-conditioner parts including the blower, and an off switch (OFF) 44 for stopping the operation of the air-conditioner parts.

The temperature setter 38 is composed of up-down switches 45a, 45b, and a display unit 46 associated therewith for displaying a setting temperature ($T_{SET}$). By actuating the up-down switches 45a, 45b, the setting temperature ($T_{SET}$) to be indicated on the display unit 46 can be varied within a predetermined range. The upper-part temperature setter 39 has a knob 47 of the dial type, for example, so that the upper-part setting temperature can be varied within a preset range (COLD - WARM). Alternatively, the temperature setter 38 and the upper-part temperature setter 39 may be of the type having a slidable temperature setting lever manually movable to adjustably set a desired temperature.

The microcomputer 33 is of a conventional type known per se and comprises a central processing unit, a read only memory (ROM), a random access memory (RAM), and an input/output port (I/O), all not shown. The microcomputer 33 outputs various control signals to the actuators 6, 11, 19, 22 and the motor of the blower 7 via driver circuits 48a through 48e, respectively, based on the various input signals described above, to thereby control the operation of the various doors 5, 10, 16, 17, 18, 20 and the rotation of the blower motor.

Figure 3:
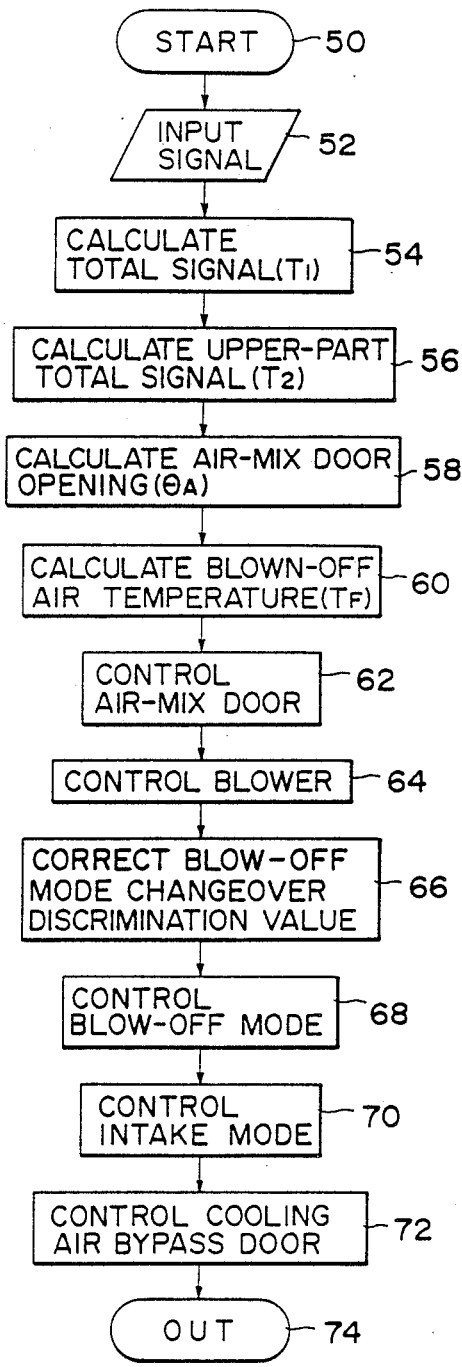
FIG. 3 is a flowchart showing a main control routine achieved in the apparatus of FIG. 2.

The operation of the microcomputer 33 will now be described with reference to a flowchart shown in FIG. 3 in which a main control routine for the air-conditioner parts by the microcomputer 33 is illustrated.

Upon turning on a non-illustrated main switch, the control routine of the microcomputer 33 starts in a step 50 in accordance with a program stored in the microcomputer 33, and inputs the various signals in a step 52. In the next step 54, based on a vehicle compartment temperature $T_R$, an outside temperature $T_A$, an amount of radiant energy of the sun $T_S$ and a setting temperature $T_{SET}$, a total signal $T_1$ is calculated particularly by the following equation:

$$T_1 = K_R \cdot T_R + K_A \cdot T_A + K_S \cdot T_S - K_{SET} \cdot T_{SET} \tag{1}$$

where $K_R$, $K_A$, $K_S$ and $K_{SET}$ are constants. From this equation, it is understood that the larger the value of the total signal $T_1$ is, the larger the cooling load of the vehicle compartment is increased. Conversely, the smaller the value of the total signal $T_1$ is, the larger the heating load of the vehicle compartment is increased.

After calculation of the total signal $T_1$, the control goes to a step 56 in which, based on an upper-part temperature $T_R h$, an amount of radiant energy of the sun $T_S$ and an upper-part setting temperature $T_{SET} h$, an upper-part total signal $T_2$ is calculated particularly by the following equation:

$$T_2 = a \cdot T_R h + b \cdot T_S - c \cdot T_{SET} h \tag{2}$$

where a, b and c are constants. From this equation, it is understood that the larger the value of the upper-part total signal $T_2$ is, the more it is necessary to cool the upper portion of the vehicle compartment where the head of an occupant may exist. Conversely, the smaller the value of the upper-part total signal $T_2$ is, the more it is necessary to heat the upper portion of the vehicle compartment.

Figure 4:
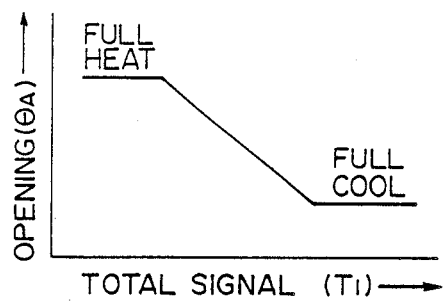
FIG. 4 is a characteristic line graph showing the relation between a total signal $T_1$ and the opening of an air-mix door.

Then in a step 58, based on the total signal $T_1$ obtained at the step 54, the opening $\Theta_A$ of the air-mix door 10 is calculated in accordance with a preset pattern shown in FIG. 4. In the next step 60, based on an output value $T_E$ of the mode sensor 29 and the opening $\Theta_A$ of the air-mix door 10, a blown-off (i.e., blown-off into the compartment 15) air temperature $T_F$ is calculated particularly by the following equation:

$$T_F = T_E + \beta \cdot \Theta_A \tag{3}$$

where $\beta$ is a constant.

Thereafter, the control goes to a step 62 in which the air-mix door 10 is driven and controlled until the opening $\Theta_A$ of the air-mix door 10 reaches the value calculated at the step 58; and in a step 64, the rotation speed of the blower 7 is controlled in accordance with the value of the total signal $T_1$.

In a step 66, the blown-off air change-over judgment value $T_{F1}$ through $T_{F8}$, for use in controlling the blow-off mode in the next step 68, are corrected in accordance with the value of the individual upper-part total signal $T_2$. Practically, this correction is achieved by adding a correcting member of $\alpha \cdot T_2$ to the value $t_1$ through $t_8$ of $T_{F1}$ through $T_{F8}$ preset as shown in Table 1.

TABLE 1

| | |
|---|---|
| $T_{F1}$ | $t_1 + \alpha \cdot T_2$ |
| $T_{F2}$ | $t_2 + \alpha \cdot T_2$ |
| $T_{F3}$ | $t_3 + \alpha \cdot T_2$ |
| $T_{F4}$ | $t_4 + \alpha \cdot T_2$ |
| $T_{F5}$ | $t_5 + \alpha \cdot T_2$ |
| $T_{F6}$ | $t_6 + \alpha \cdot T_2$ |
| $T_{F7}$ | $t_7 + \alpha \cdot T_2$ |
| $T_{F8}$ | $t_8 + \alpha \cdot T_2$ | where $\alpha$ is a constant. $T_{F1}$ through $T_{F8}$ are listed in the order of value reducing gradually from $T_{F1}$ toward $T_{F8}$.

After the blow-off mode has been changed over and controlled based on the thus corrected change-over judgment, the intake mode is set in a step 70. The control then goes to a step 72 to perform the control of the cool air bypass door 21. The opening $\Theta_B$ of the cool air bypass door 21 is calculated by the following equation (4). The bypass door 21 is angularly moved, via the driver circuit 48d and the actuator 22, according to the output signal from the microcomputer 33 until the actual opening of the bypass door 21 reaches the calculated value.

$$\Theta_B = K_R h \left( \Delta T_R h + \frac{1}{T} \int_0^T \Delta T_R h \cdot dt \right) \tag{4}$$

where $K_R h$ stands for a constant, and $\Delta T_R h$ stands for the difference between an upper-part setting temperature $T_{SET}$ set by the upper-part temperature setter 39, and an upper-part temperature $T_R h$ detected by the upper-part temperature sensor 26. Upon completion of this step 72, the control goes to another control routine via a step 74.

Figure 5:
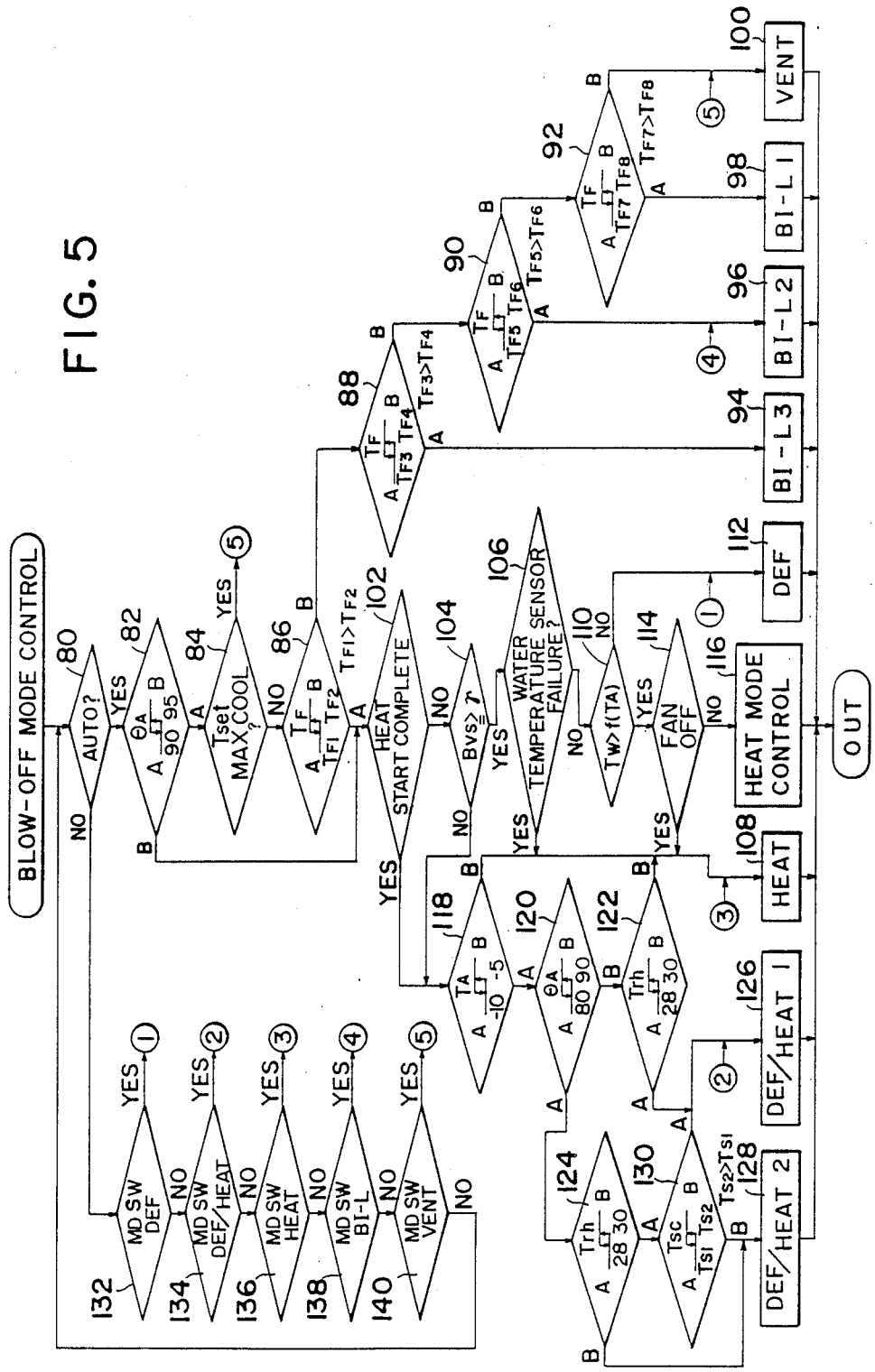
FIG. 5 is a flowchart showing a definite routine of controlling a blow-off mode.

FIG. 5 illustrates, of the main control routine, a subroutine for the control of the blow-off mode. As the control comes into this subroutine, the microcomputer 33 makes, in a step 80, a judgment as to whether the change-over of the blow-off mode is ready to be automatically performed particularly by depressing the automatic switch (AUTO) 43. If the judgment indicates the AUTO state, the control proceeds to a step 82.

In the step 82, a judgment is made as to whether the actual opening $\Theta_A$ of the air-mix door 10 is smaller than a predetermined value (e.g., 90 to 95%) nearly the full heat state. If it is smaller (A), the control goes to a step 84 in which a judgment is made then as to whether the setting temperature $T_{SET}$ has been set at a value requiring the maximum cooling. If it is judged that the setting temperature $T_{SET}$ is the settable minimum value, then the control goes to a step 100 where the blow-off mode is fixed in the VENT mode to open the vent outlet 13 to a full extent. On the contrary, if judged that it is not the minimum value, the control proceeds to a step 86. In the step 86, the blown-off air temperature $T_F$ is lower than the change-over discrimination values $T_{F1}$, $T_{F2}$ (B), the control goes to a step 88 to judge as to whether $T_F$ is lower than the change-over discrimination value $T_{F3}$, $T_{F4}$. Also in the step 88, $T_F$ is lower than the change-over discrimination value $T_{F3}$, $T_{F4}$ (B), the control goes to a step 90 to judge as to whether $T_F$ is lower than the change-over discrimination values $T_{F5}$, $T_{F6}$. In this step 90, if $T_F$ is lower than the change-over discrimination values $T_{F5}$, $T_{F6}$ (B), the control goes to a step 92 to judge as to whether $T_F$ is lower than the change-over discrimination values $T_{F7}$, $T_{F8}$.

In the step 88, if $T_F$ is higher than the change-over discrimination values $T_{F3}$, $T_{F4}$, the control goes to a step 94 where the blow-off mode is changed over to the BI-L mode (BI-L3) in which the ratio of the amount of air blown-off from the vent outlet 13 to the amount of air blown-off from the heat outlet 14 is set at 7 to 3. In the same step 88, if $T_F$ is higher than the change-over discrimination values $T_{F5}$, $T_{F6}$, the control goes to a step 96 where the blow-off mode is changed over to the BI-L mode (BI-L2) in which the ratio of the amount of air blown-off from the vent outlet 13 to the amount of air blown-off from the heat outlet 14 is set at 5 to 5. Still in the same step 88, $T_F$ is higher than the change-over discrimination values $T_{F7}$, $T_{F8}$, the control goes to a step 98 where the blow-off mode is changed over to the BI-L mode (BI-L1) in which the ratio of the amount of air blown-off from the vent outlet 13 to the amount of air blown-off from the heat outlet 14 is set at 7 to 3. Also in the same step 88, if $T_F$ is lower than $T_{F7}$, $T_{F8}$, then the control goes to a step 100 where the BI-L mode is changed over to the VENT mode.

On the other hand, in the step 82, if it is judged that the opening $\Theta_A$ of the air-mix door 10 is larger than a predetermined value (90 to 95%) nearly the full heat (B) and, in the step 86, if it is judged that $T_F$ is higher than the change-over discrimination values $T_{F1}$, $T_{F2}$ (A), the control proceeds to 102 where a judgment is performed as to whether starting of the heating operation has completed or not by judging particularly whether the cooling water of the engine has been heated up to reach a predetermined temperature. The reason why it is necessary to judge as to whether starting of the heating operation has been completed is that if the cooling water of the engine is only insufficiently warm at the very start of the engine, controlling of the heating operation is restricted.

In the step 102, if it is judged that starting of the heating operation has not completed, the control goes to a step 104 where a judgment is made as to whether a voltage $B_{VS}$ impressed to the motor of the blower 7 is at least equal to a predetermined value (gamma). If starting of the heating operation has not completed and if the amount of blown-off air is large, a large amount of cold air is blown out from a lower portion of the vehicle compartment where the legs of an occupant may exist; consequently, in order to restrict the amount of air to be blown out toward the legs of the occupant, the procedures of a step 106 onwards are performed.

In the step 106, a judgment is made as to whether the water temperature sensor 30 is out of order. Since if it is out of order, it cannot be judged that starting of the heating operation has been actually completed, the control goes to a step 108 in order to make arrangements so that the heating operation can be made without failure, thus avoiding any nonstable heating state. In the step 108, the blow-off mode is changed over to the HEAT mode in which the heat outlet 14 is opened, and the vent outlet 13 is closed. At that time, though during the HEAT mode, the amount of defrosting air bleeding from the defroster outlet 12 is 20% of the total amount of blown-off air.

Figure 6:
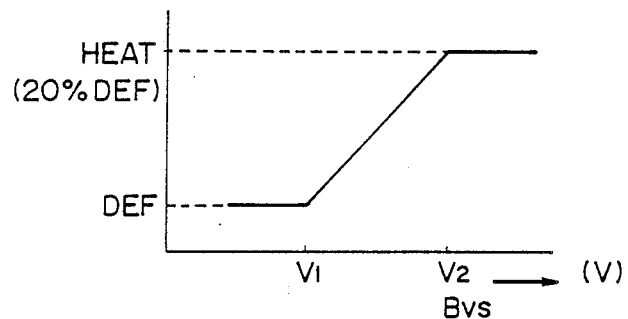
FIG. 6 is a characteristic line graph showing the relation between a voltage impressed to a motor of a blower and the amount of air bleeding from a defroster outlet.

On the other hand, if the water temperature sensor 30 is in order, the control proceeds to a step 110 where a judgment is made as to whether the water temperature $T_W$ is higher than a predetermined value f ($T_A$) calculated based on an outside temperature $T_A$. If the water temperature $T_W$ is still lower than the predetermined value, the control goes to a step 112 in order to prevent cold air from being blown out from the lower portion of the vehicle compartment where the legs of an occupant may exist. In this step 112, the blow-off mode is fixed in the DEF mode in which only the defroster outlet 12 is opened to an full extent. If the water temperature $T_W$ rises, the control goes to a step 114 where a judgment is made as to whether the blower 7 is stopped. While the blower 7 is still, there is no danger that cold air is blown out over the legs of the occupant. Consequently, the control goes to the step 108 to change over the blow-off mode to the HEAT mode. If the blower 7 is in operation, the control proceeds to a step 116 where the amount of air bleeding from the defroster outlet 12 is set from the voltage $B_{VS}$ impressed to the motor of the blower 7, based on a predetermined pattern particularly shown in FIG. 6.

If it is judged in the step 102 that starting of the heating operation has been completed or if it is judged in the step 104 that the voltage $B_{VS}$ is lower than a predetermined value (gamma) impressed to the motor of the blower 7, the control proceeds to a step 118 where a judgment is made as to whether the outside temperature $T_A$ is lower than a predetermined temperature (e.g., $-10°$ to $-5°$ C.). When TA is higher than this predetermined temperature (B), the control goes to the step 102 where the blow-off mode is set to the HEAT mode. On the contrary, when $T_A$ is lower than the predetermined temperature (A), it is necessary to deliver air along the windowpanes also from the defroster outlet 12 in the following manner for preventing the windowpanes from being clouded.

Figure 7:
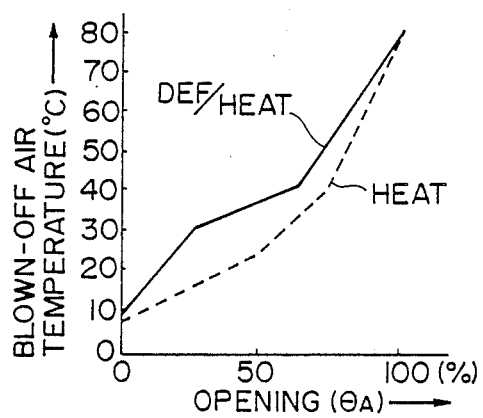
FIG. 7 is a characteristic line graph showing the relation between the temperature of air to be blown-off and the opening of the air-mix door.

First of all, in a step 120, a judgment is made as to whether the actual opening $\Theta_A$ of the air-mix door 10 is larger than a predetermined amount (e.g., 80 to 90%) achieving a relatively greater cooling ability. When $\Theta_A$ is on the full heat side with respect to this predetermined value (B), the blown-off air temperature is high, as shown in FIG. 7. At that time, therefore, though air is blown out along the windowpanes from the defroster outlet 12, air temperature would not become lower; that is, especially the upper-part temperature would rise to thereby giving an unpleasant feeling to the occupant. Accordingly, when the upper-part temperature $T_Rh$ is increased, the control goes to a step 122 to reduce the amount of air bleeding from the defroster outlet 12. If $T_Rh$ is higher than a predetermined temperature (e.g., 28° to 30° C.) (B), the control goes to the step 108 in order to minimize the warm air bleed from the defroster outlet 12. In this step 108, the blow-off mode is set to the HEAT mode. If $T_Rh$ is lower than the predetermined temperature, the control proceeds to a step 126 where the blow-off mode is changed over to the DEF/HEAT mode (DEF/HEAT 1) in which the amount of air bleeding from the defroster outlet 12 is set at a relatively small value, e.g. 35%.

In FIG. 7, the dotted line stands for a characteristic line at the HEAT mode, and the solid line stands for a characteristic line at the DEF/HEAT mode in which the amount of defrosting air bleeding from the defroster outlet 12 and the amount of air being blown out from the heat outlet 14 are 80% and 20%, respectively.

When $\Theta_A$ is smaller than the predetermined amount (A), the blown-off air temperature is lowered as shown in FIG. 7. If $T_Rh$ is higher than the predetermined temperature (28° to 30° C.), the upper-part temperature would not rise though the amount of defrosting air is increased to some extent. Accordingly, in a step 124, a judgment is made as to whether $T_Rh$ is higher than the predetermined temperature. If it is higher (B), the control goes to a step 128 where the blow-off mode is changed over to DEF/HEAT mode (DEF/HEAT 2) in which the amount of defrosting air is set at 50%, for example. Conversely, if $T_Rh$ is lower than the predetermined temperature (A), the control proceeds to a step 130 where a sunlit correction is made according to a control value $T_{SC}$ concerning the amount of radiant energy of the sun. Namely, when $T_{SC}$ is lower than the predetermined values $T_{S1}$, $T_{S2}$ (A), the amount of radiant energy of the sun is small, and additionally the opening of the air-mix door 10 is smaller than the predetermined amount, and therefore the blown-off air temperature is low. At that time, assuming that the amount of defrosting air bleeding from the defroster outlet 12 is increased, the blown-off air temperature is further cooled due to the windowpanes so that the upper-part temperature would fall blow a desired and comfortable temperature. In this case, the control proceeds to the step 126 where the blow-off mode is changed over to the DEF/HEAT mode (DEF/HEAT 1) in which the amount of defrosting air bleeding from the defroster outlet 12 is small. Conversely, if the amount of radiant energy of the sun is large (A), such excessively and hence unpleasantly hot feeling due to the sunlight may be cancelled by increasing the amount of defrosting air. Accordingly the blow-off mode is changed over to the DEF/HEAT mode (DEF/HEAT 2) in which the amount of defrosting air is large. Since $T_{Rh}$ varies in relation to the change of opening of the air-mix door 10, the judgment based on $T_Rh$ at the step 124 may be omitted.

The control described above is for automatically changing over the blow-out mode. If any one of the mode switches 40a through 40e is depressed, the mode changes from the current automatic change-over control to the manual change-over control. In this case, the control proceeds from the step 80 to the successive steps 132 through 140, and a judgment is made as to which mode switches 40a through 40e has been depressed. As a result, if the DEF mode is selected, the control goes to the step 112. If the DEF/HEAT mode is selected, the control goes to the step 108. If the BI-L mode is selected, the control proceeds to the step 96. If the VENT mode is selected, the control goes to the step 100. Further, the manual change-over control can be changed over again to the automatic change-over control by depressing the automatic switch (AUTO) 43.

Obviously, various modifications and variations of the present invention are possible in the light of the above teaching. It is therefore to be understood that within the scope of the appended claims the invention may be practiced otherwise than as specifically described.

What is claimed is:

1. An apparatus for controlling air-conditioning of a motor vehicle comprising:
  (a) a duct defining an air flow passageway and having a defroster outlet, a vent outlet, and a heat outlet, each of said outlets opening to a compartment of the motor vehicle to allow air to be blown off from said duct into said vehicle compartment;
  (b) a heater core disposed in said air flow passageway of said duct, at a position biased toward one end of said air flow passageway, for heating air passing said heater core;
  (c) an air-mix door disposed in said duct upstream of said heater core for regulating an amount of air passing through said heater core and an amount of air bypassing said heater core;
  (d) an evaporator disposed in said duct upstream of said heater core for cooling air passing said evaporator;
  (e) at least one mode door disposed in said duct for opening and closing said outlets selectively;
  (f) air-mix door opening calculation means for calculating the amount of opening of said air-mix door based on at least a vehicle compartment temperature and a setting temperature;
  (g) blown-off air temperature calculation means for calculating the temperature of air blown off into the vehicle compartment based on the amount of opening of said air-mix door and the cooling temperature of said evaporator;
  (h) defrosting-air bleeding determination means for determining the amount of air bleeding from said defroster outlet, based on at least an outside temperature and the calculated amount of opening of said air-mix door, when the blown-off air temperature calculated by said blown-off air temperature calculation means is higher than a predetermined temperature; and
  (i) drive and control means for driving and controlling said mode door in such a manner that the amount of air bleeding from said defroster outlet is equal to an amount determined by said defrosting-air bleeding determination means.

2. An apparatus according to claim 1, wherein said defrosting-air bleeding determination means is operable to select a first defrost and heat mode in which the amount of air bleeding from said defroster outlet is relatively small when at least the outside temperature is lower than a predetermined temperature and when the amount of opening of said air-mix door is at least a predetermined amount and also when a temperature at an upper portion of the vehicle compartment is lower than a predetermined temperature.

3. An apparatus according to claim 1, wherein said defrosting-air bleeding determination means is operable to select a second defrost and heat mode in which the amount of air bleeding from said defroster outlet is relatively large when at least the outside temperature is lower than a predetermined temperature and when the amount of opening of said air-mix door is at least a predetermined amount and also when a temperature at an upper portion of the vehicle compartment is higher than a predetermined temperature.

* * * * *